(12) United States Patent
Kim et al.

(10) Patent No.: US 9,776,173 B2
(45) Date of Patent: Oct. 3, 2017

(54) HOLLOW METAL NANOPARTICLES

(71) Applicant: LG CHEM, LTD., Seoul (KR)

(72) Inventors: Kwanghyun Kim, Daejeon (KR); Gyo Hyun Hwang, Daejeon (KR); Sang Hoon Kim, Daejeon (KR); Jun Yeon Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/893,811

(22) PCT Filed: Jun. 3, 2014

(86) PCT No.: PCT/KR2014/004934
§ 371 (c)(1),
(2) Date: Nov. 24, 2015

(87) PCT Pub. No.: WO2014/196785
PCT Pub. Date: Dec. 11, 2014

(65) Prior Publication Data
US 2016/0107147 A1    Apr. 21, 2016

(30) Foreign Application Priority Data

Jun. 7, 2013 (KR) ........................ 10-2013-0065446

(51) Int. Cl.
| | |
|---|---|
| *B32B 5/16* | (2006.01) |
| *B22F 1/00* | (2006.01) |
| *B01J 23/89* | (2006.01) |
| *B01J 35/00* | (2006.01) |
| *B01J 35/08* | (2006.01) |
| *B82Y 15/00* | (2011.01) |

(52) U.S. Cl.
CPC ........... *B01J 23/892* (2013.01); *B01J 35/006* (2013.01); *B01J 35/0013* (2013.01); *B01J 35/08* (2013.01); *B22F 1/0018* (2013.01); *B22F 1/0051* (2013.01); *B22F 2001/0029* (2013.01); *B22F 2001/0037* (2013.01); *B82Y 15/00* (2013.01); *Y10S 977/777* (2013.01)

(58) Field of Classification Search
CPC ..... B22F 1/0018; B22F 1/0029; B22F 1/0051
USPC ................................ 428/547, 550, 570, 403
See application file for complete search history.

(56) References Cited

U.S. PATENT DOCUMENTS

| | | |
|---|---|---|
| 6,752,979 B1 | 6/2004 | Talbot et al. |
| 2005/0025689 A1 | 2/2005 | Talbot et al. |
| 2005/0025698 A1 | 2/2005 | Talbot et al. |

(Continued)

FOREIGN PATENT DOCUMENTS

| | | |
|---|---|---|
| CN | 1476413 A | 2/2004 |
| CN | 101501790 A | 8/2009 |

(Continued)

OTHER PUBLICATIONS

Liu et al, Synthesis and catalytic properties of bimetallic nanomaterials with various architectures, Nano Today (2012) 7, 448-466.*

(Continued)

*Primary Examiner* — Holly Le
(74) *Attorney, Agent, or Firm* — Dentons US LLP

(57) ABSTRACT

The present specification relates to a hollow metal nanoparticle. Specifically, the present specification relates to a hollow metal nanoparticle having a cavity.

15 Claims, 9 Drawing Sheets

(56) References Cited

U.S. PATENT DOCUMENTS

| | | | |
|---|---|---|---|
| 2010/0258759 A1 | 10/2010 | Archer et al. | |
| 2011/0311635 A1 | 12/2011 | Stucky et al. | |
| 2012/0321897 A1 | 12/2012 | Yang et al. | |
| 2015/0299758 A1 | 10/2015 | Yasuda et al. | |
| 2015/0328629 A1* | 11/2015 | Cho | B22F 9/24 502/182 |
| 2016/0096223 A1* | 4/2016 | Kim | B22F 1/0018 75/255 |
| 2017/0128915 A1* | 5/2017 | Bang | B01J 23/892 |

FOREIGN PATENT DOCUMENTS

| | | | |
|---|---|---|---|
| CN | 102430413 A | 5/2012 | |
| CN | 102554262 A | 7/2012 | |
| JP | 2008284411 A | 11/2008 | |
| KR | 10-2009-0123404 A | 12/2009 | |
| KR | 10-2011-0040006 A | 4/2011 | |
| WO | 2012123435 A1 | 9/2012 | |
| WO | 2013069732 A1 | 5/2013 | |

OTHER PUBLICATIONS

Sun et al, Platinum catalyzed growth of NiPt hollow spheres with an ultrathin shell, J. Mater. Chem., 2011, 21, 1925-1930.*

Shan et al, Monodispersed, ultrathin NiPt hollow nanospheres with tunable diameter and composition via a green chemical synthesis, J. Mater. Chem. A, 2015, 3, 1031.*

Chen et al., Highly Crystalline Multimetallic Nanoframes with three-dimensional electrocatalytic surfaces, Science, vol. 343, Mar. 2014.*

Fan et al, Formation of nanotubes and hollow nanoparticles based on Kirkendall and diffusion processes: A Review, Small 2007, 3, No. 10, 1660-1671.*

Yanchun Zhao et al., "Methonal electro-oxidation on Ni@Pd core-shell nanoparticles supported on multi-walled carbon nanotubes in alkaline media", International Journal Hydrogen Energy, 2010, vol. 35, pp. 3249-3257.

Li et al., "Hollow Pt—Ni alloy nanospheres with tunable chamber structure and enhanced activity," Journal of Materials Chemistry 21(45): 18447-18453 (2011).

Zhou et al., "Preparation of PtNi hollow nanospheres for the electrocatalytic oxidation of methanol," Journal of Power Sources 196(14): 5844-5848 (2011).

Hu et al., "Synthesis of hollow mesoporous Pt—Ni nanosphere for highly active electrocatalysis toward the methanol oxidation reaction," Electrochemistry Communications 18: 96-99 (2012).

Gao et al., "Bimetallic Ag—Pt hollow nanoparticles: Synthesis and tunable surface plasmon resonance," Scripta Materialia 57(8): 687-690 (2007).

Kim et al., "Facile fabrication of hollow Pt/Ag nanocomposites having enhanced catalytic properties," Applied Catalysis B: Environmental 103(1): 253-260 (2011).

* cited by examiner

[Figure 1]
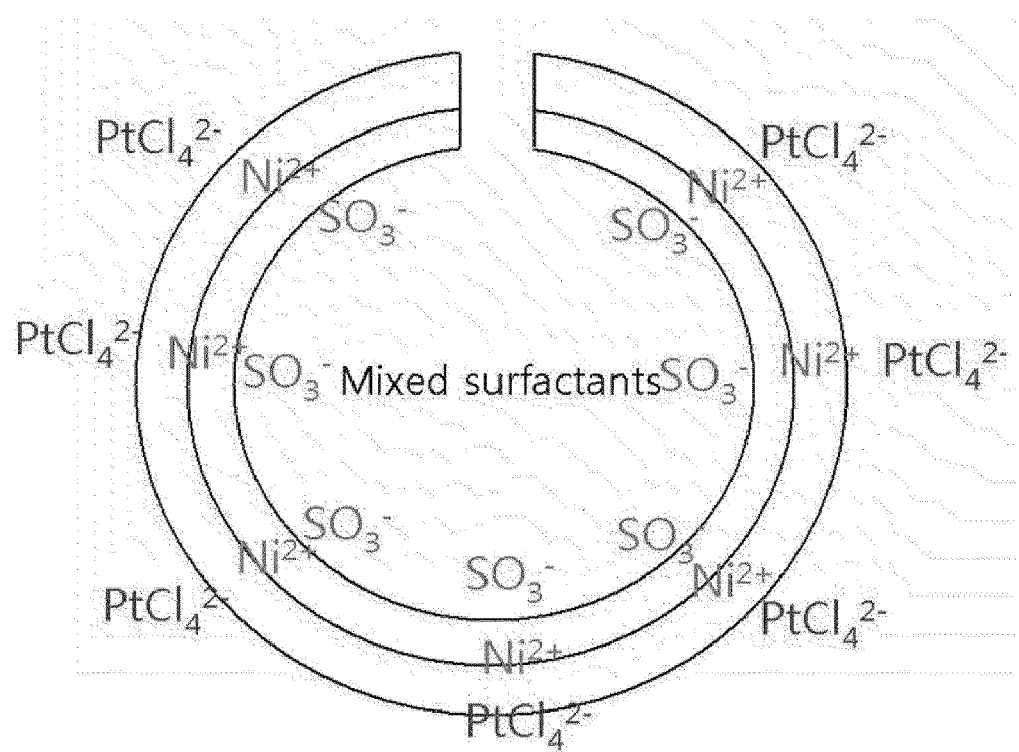

[Figure 2]
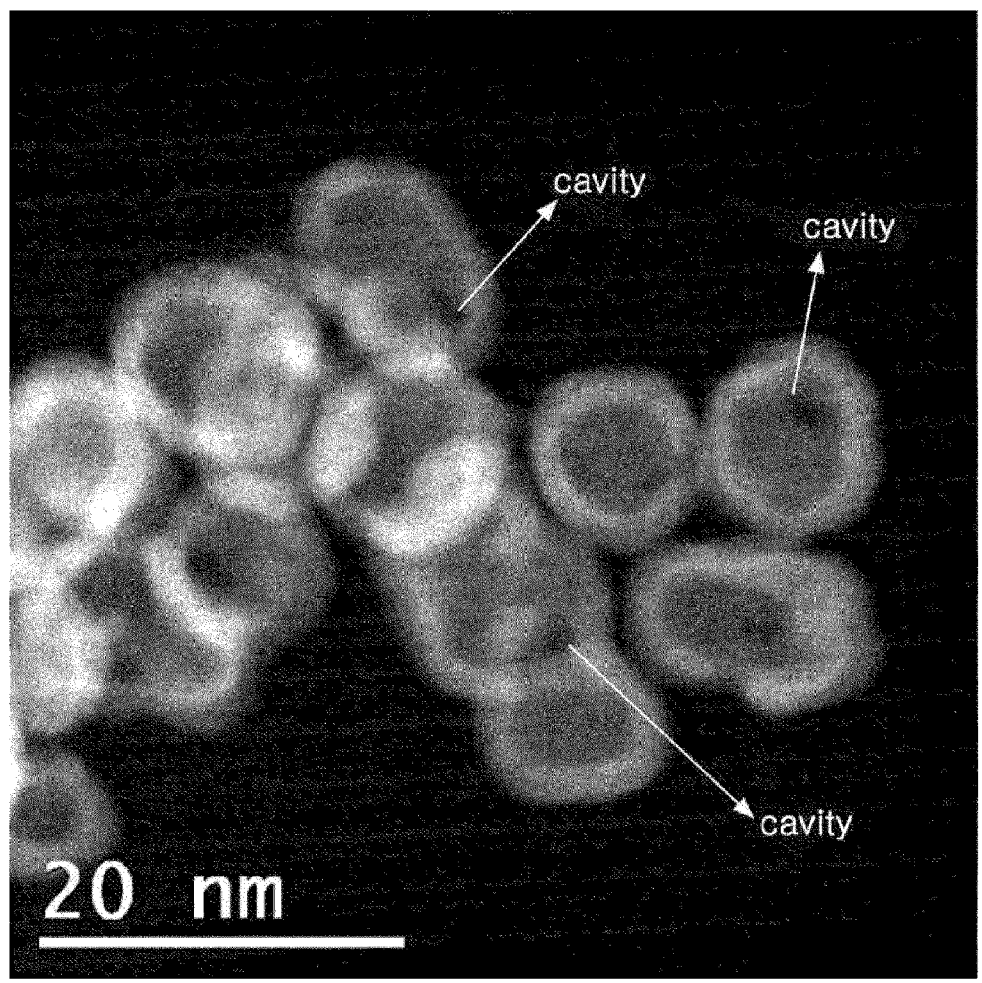

[Figure 3]
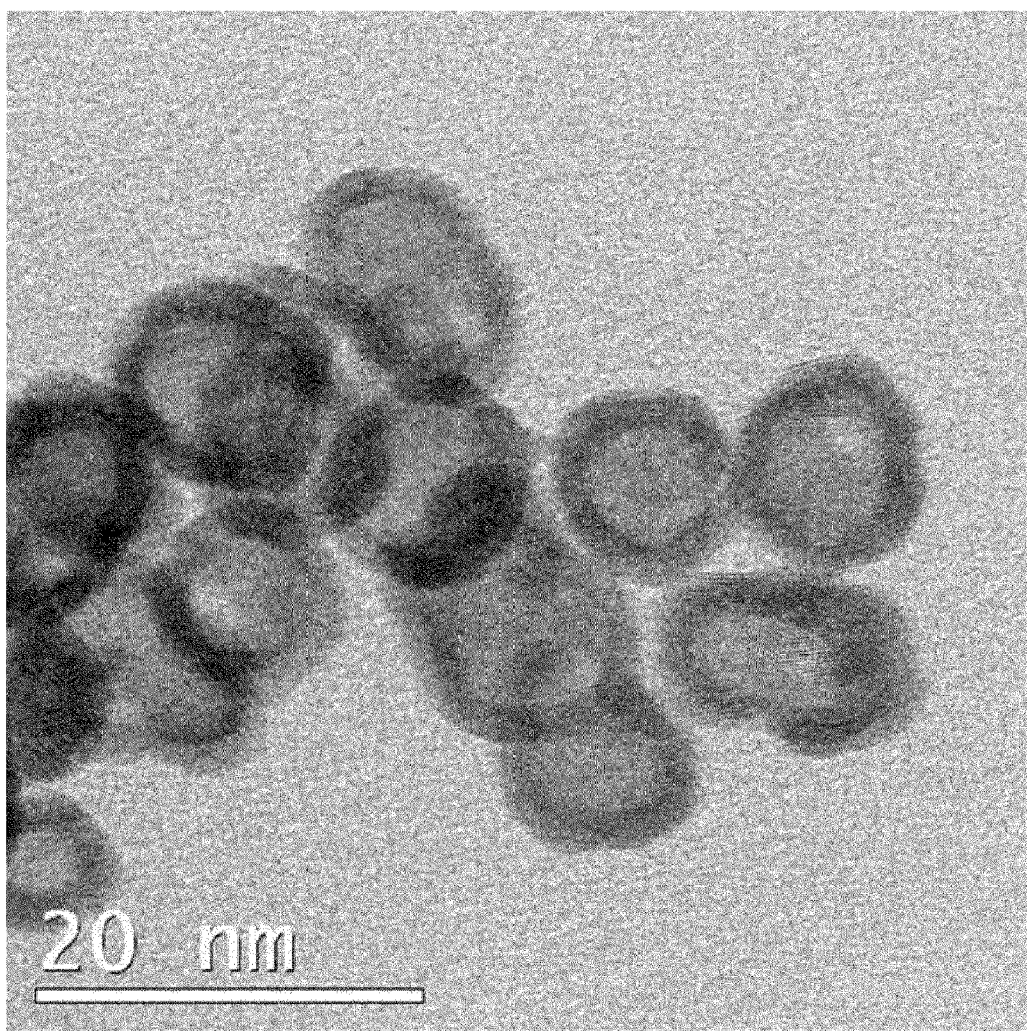

[Figure 4]
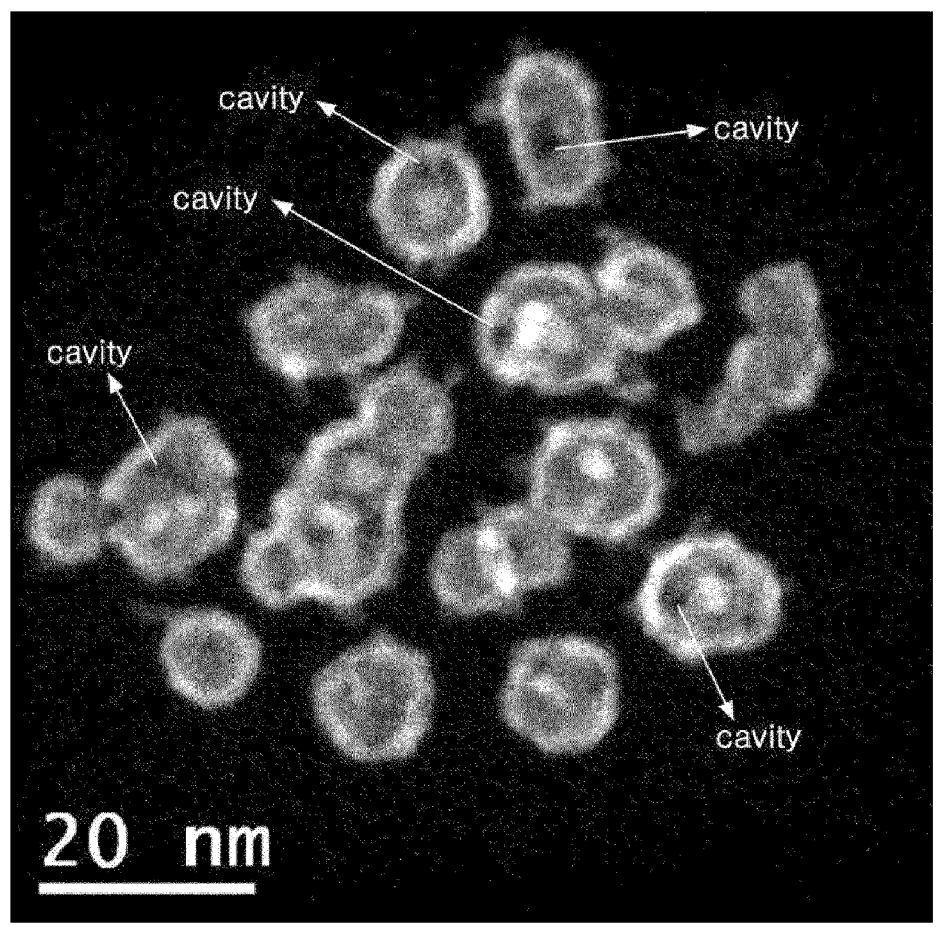

[Figure 5]
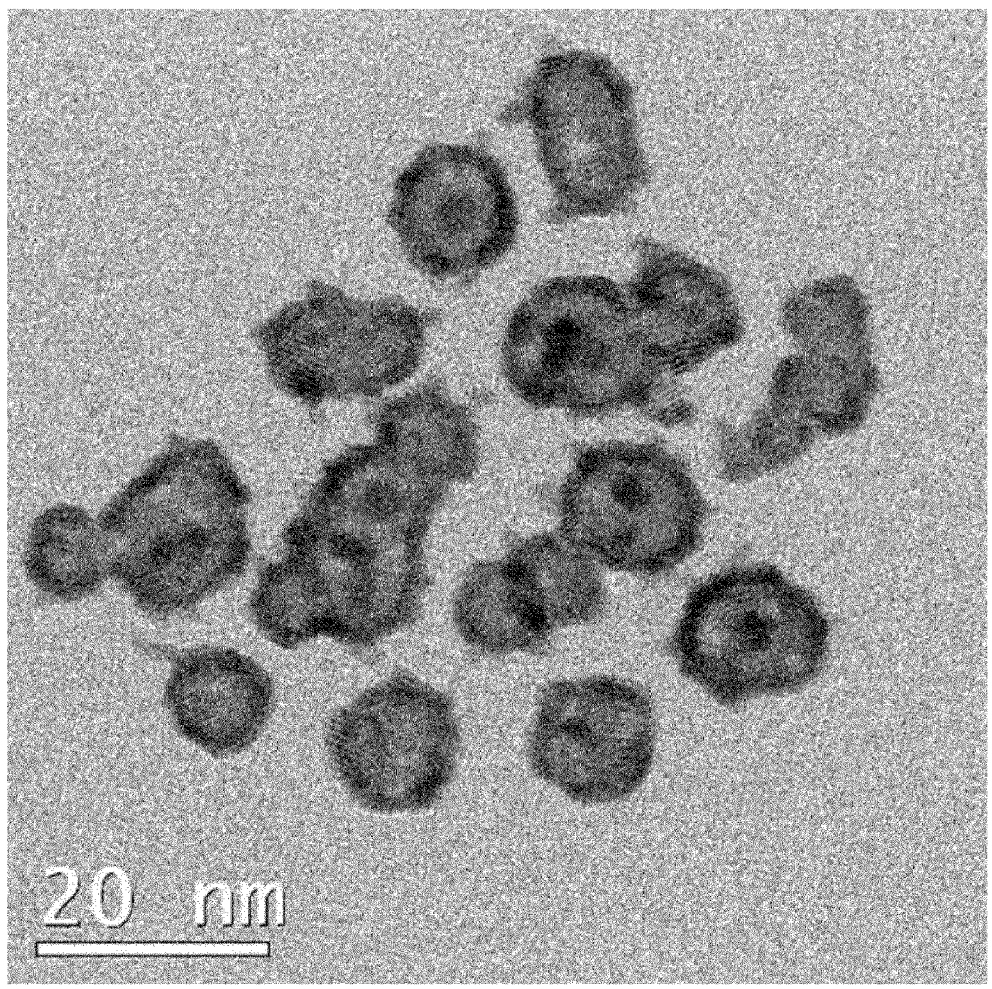

[Figure 6]
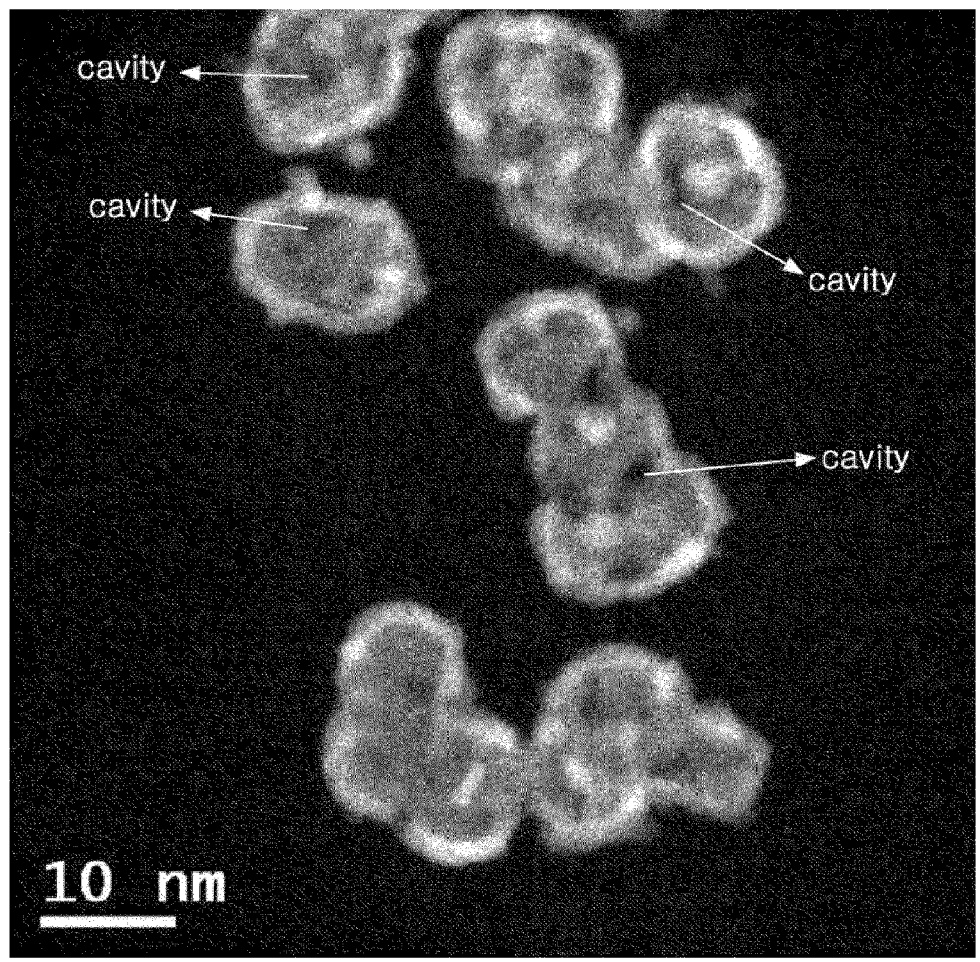

[Figure 7]
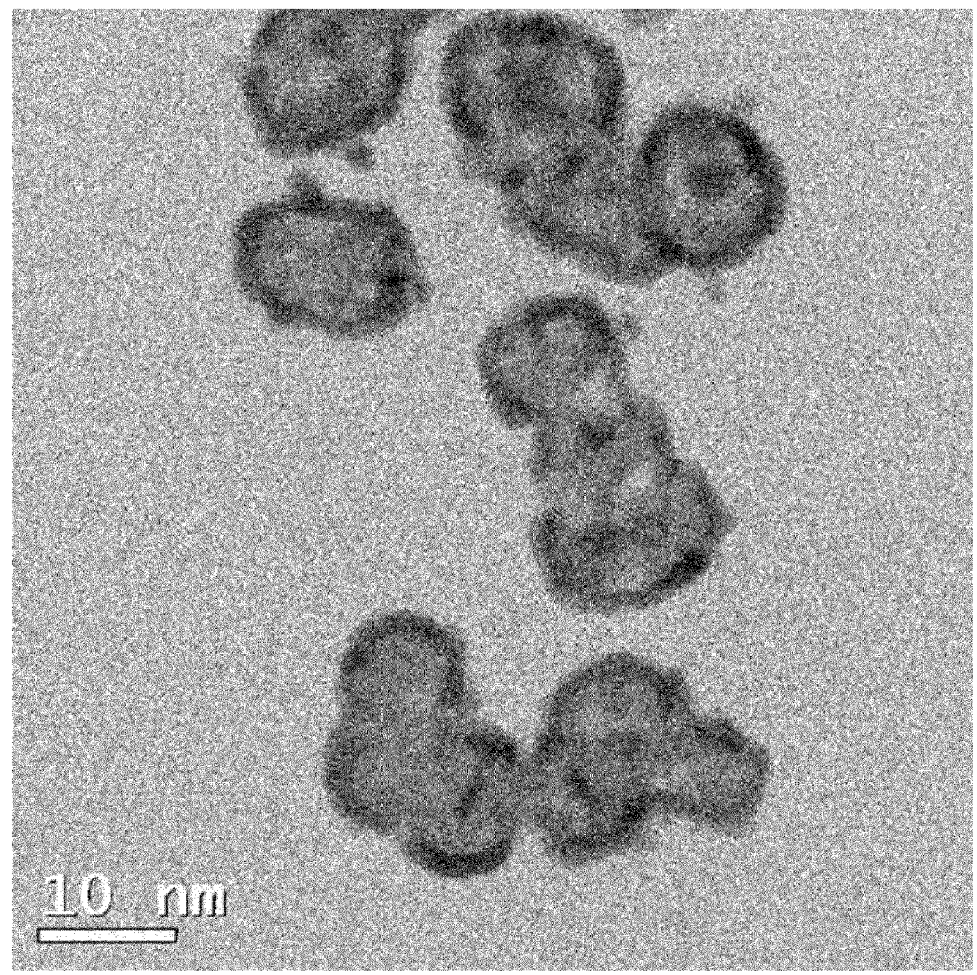

[Figure 8]
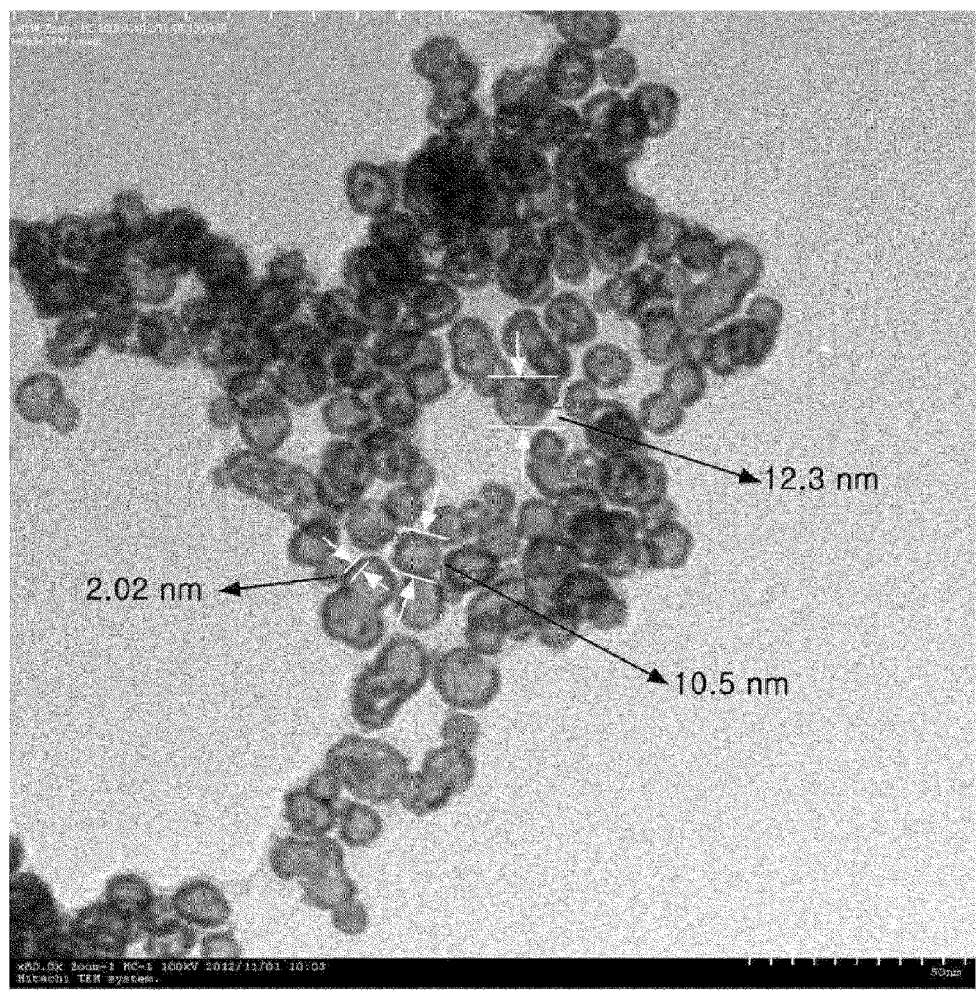

[Figure 9]
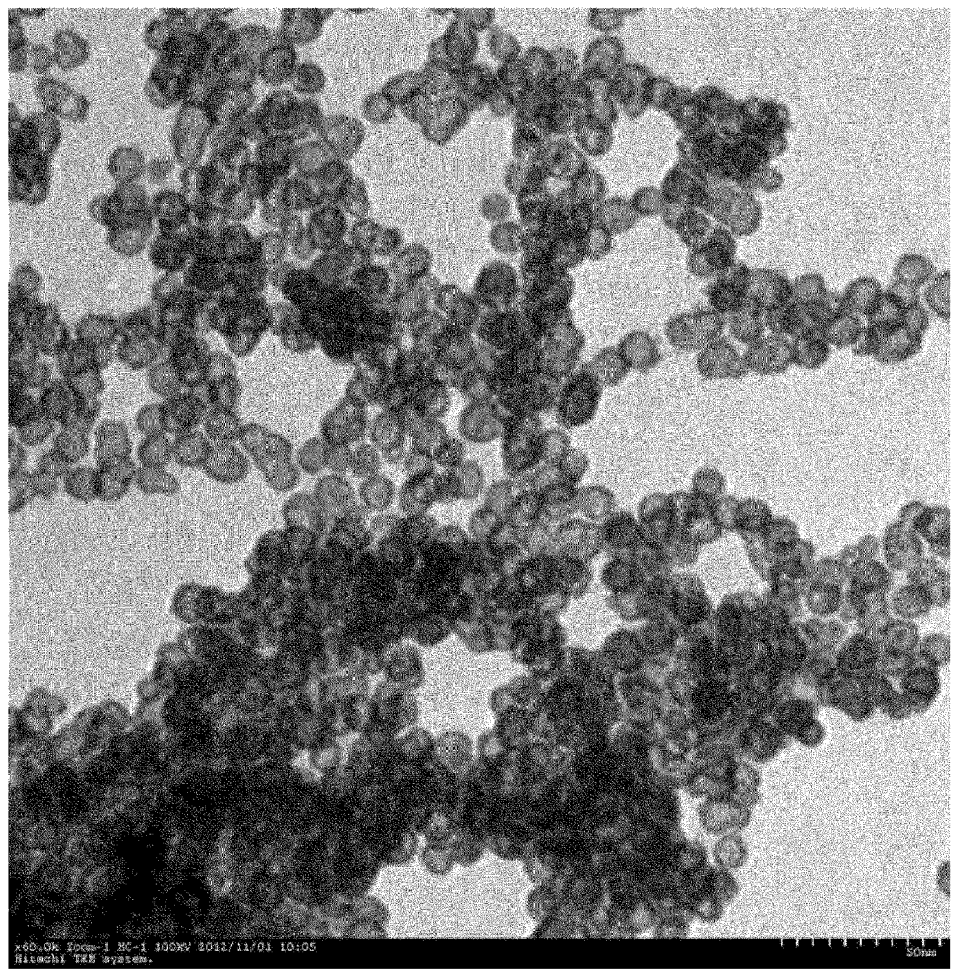

HOLLOW METAL NANOPARTICLES

This application is a National Stage Entry of International Application No. PCT/KR2014/004934, filed Jun. 3, 2014, and claims the benefit of and priority to Korean Application No. 10-2013-0065446, filed on Jun. 7, 2013, both of which are hereby incorporated by reference in their entirety for all purposes as if fully set forth herein.

TECHNICAL FIELD

The present specification claims priority to and the benefit of Korean Patent Application No. 10-2013-0065446 filed in the Korean Intellectual Property Office on Jun. 7, 2013, the entire contents of which are incorporated herein by reference.

The present specification relates to a hollow metal nanoparticle.

BACKGROUND ART

Nanoparticles are particles having nanoscale particle sizes, and show optical, electrical and magnetic properties completely different from those of bulk materials due to a large specific surface area and the quantum confinement effect, in which energy required for electron transfer changes depending on the size of material. Accordingly, due to such properties, much interest has been concentrated on their applicability in the catalytic, electromagnetic, optical, medical fields, and the like. Nanoparticles may be considered as intermediates between bulks and molecules, and may be synthesized in terms of two approaches, that is, the "top-down" approach and the "bottom-up" approach.

Examples of a method for synthesizing a metal nanoparticle include a method for reducing metal ions in a solution by using a reducing agent, a method for synthesizing a metal nanoparticle using gamma-rays, an electrochemical method, and the like, but in the existing methods, it is difficult to synthesize nanoparticles having a uniform size and shape, or it is difficult to economically mass-produce high-quality nanoparticles for various reasons such as problems of environmental contamination, high costs, and the like by using organic solvents. Accordingly, there is a need for developing high-quality nanoparticles having a uniform size.

DETAILED DESCRIPTION OF THE INVENTION

Technical Problem

The present specification has been made in an effort to provide a high-quality hollow metal nanoparticle having a uniform size.

Technical Solution

The present specification provides a hollow metal nanoparticle including: a hollow core portion; a shell portion including a first metal and a second metal; and a cavity extending from the outer surface of the shell portion to the hollow core in one or two or more regions of the shell portion.

Further, an exemplary embodiment of the present specification provides a catalyst including the metal nanoparticles.

Advantageous Effects

The hollow metal nanoparticles of the present specification have an advantage in that hollow metal nanoparticles with a uniform size of several nanometers are provided and thus may be applied in various fields. Furthermore, since the hollow metal nanoparticle of the present specification includes a cavity and an internal surface area of the shell may be utilized as a contact area through the cavity, there is an advantage in that the catalyst efficiency is increased when the metal nanoparticles are included in the catalyst.

BRIEF DESCRIPTION OF DRAWINGS

FIG. 1 illustrates an example of the hollow metal nanoparticle according to an exemplary embodiment of the present specification.

FIGS. 2 and 3 illustrate transmission electron microscope (TEM) images of the hollow metal nanoparticles prepared in Example 1 of the present specification.

FIGS. 4 and 5 illustrate transmission electron microscope (TEM) images of the hollow metal nanoparticles prepared in Example 2 of the present specification.

FIGS. 6 and 7 illustrate transmission electron microscope (TEM) images of the hollow metal nanoparticles prepared in Example 3 of the present specification.

FIGS. 8 and 9 illustrate transmission electron microscope (TEM) images of the hollow metal nanoparticles prepared in Example 4 of the present specification.

BEST MODE

The benefits and features of the present application and the methods of achieving the benefits and features will become apparent with reference to exemplary embodiments to be described below in detail along with the accompanying drawings. However, the present application is not limited to the exemplary embodiments to be disclosed below, but may be implemented in various other forms, and the present exemplary embodiments are provided for rendering the disclosure of the present application complete and for fully representing the scope of the invention to a person with ordinary skill in the technical field to which the present application pertains, and the present application will be defined only by the scope of the claims. The size and relative size of the constituent element illustrated in the drawing may be exaggerated for the clarity of description.

Unless otherwise defined, all the terms (including technical and scientific terms) used in the present specification will be able to be used as a meaning which may be commonly understood to a person with ordinary skill in the technical field to which the present application pertains. Further, the terms defined in a dictionary generally used are not interpreted ideally or excessively unless the terms have been clearly and specially defined.

Hereinafter, the present specification will be described in more detail.

An exemplary embodiment of the present specification provides a hollow metal nanoparticle: including a hollow core portion; a shell portion including a first metal and a second metal; and a cavity extending from the outer surface of the shell portion to the hollow core in one or two or more regions of the shell portion. In the hollow metal nanoparticle of the present specification, a surfactant may be included in and removed from the inner hollow of the hollow metal nanoparticle. FIG. 1 illustrates an example of the cases where two or more surfactants are mixed in the inner hollow, as a step before a shell portion is formed by a reducing agent when the hollow metal nanoparticle of the present specification is prepared.

According to an exemplary embodiment of the present specification, the hollow may include a surfactant. Further, according to an exemplary embodiment of the present specification, a surfactant may be removed from the hollow.

In the present specification, the term "hollow" means that the core portion of the metal nanoparticle is empty. Further, the term "hollow" may be used as the same meaning as a hollow core. The term "hollow" may include a term such as a hollow, a hole, and a void.

According to an exemplary embodiment of the present specification, the hollow core may be present by 50% by volume to 10% by volume of the hollow metal nanoparticle. Specifically, the hollow core may be present by 70% volume or more, more specifically 80% by volume or more of the hollow metal nanoparticle.

According to an exemplary embodiment of the present specification, the hollow may include a space in which the internal material is not present by 50% by volume or more, specifically 70% by volume or more, and more specifically 80% by volume or more. Alternatively, the hollow may also include a space of which the inside is empty by 50% by volume or more, specifically 70% by volume or more, and more specifically 80% by volume or more. Alternatively, the hollow may include a space having an internal porosity of 50% by volume or more, specifically 70% by volume or more, and more specifically 80% by volume or more.

According to an exemplary embodiment of the present specification, the hollow metal nanoparticle may have a spherical shape. The spherical shape of the present specification does not mean only a perfect spherical shape, and may include a roughly spherical shape. For example, in the hollow metal nanoparticle, the outer surface having a spherical shape may not be smooth, and the radius of curvature in one hollow metal nanoparticle may not be constant.

In an exemplary embodiment of the present specification, the hollow metal nanoparticle may have a particle diameter of 1 nm to 30 nm, more specifically 20 nm or less, or 12 nm or less, or 10 nm or less. Alternatively, the metal nanoparticle may have an average particle diameter of 6 nm or less. The hollow metal nanoparticle may have an average particle diameter of 1 nm or more. When the hollow metal nanoparticle has a particle diameter of 30 nm or less, there is a big advantage in that the nanoparticle may be used in various fields. Further, it is more preferred that the metal nanoparticle have a particle diameter of 20 nm or less. In addition, when the hollow metal nanoparticle has a particle diameter of 10 nm or less, the surface area of the particle is further widened, so that there is an advantage in that the applicability of using the hollow metal nanoparticles in various fields is further increased. For example, when the hollow metal nanoparticles formed in the range of the particle diameter are used as a catalyst, the efficiency may be significantly increased.

According to an exemplary embodiment of the present specification, the average particle diameter of the hollow metal nanoparticles means a value obtained by using a graphic software (MAC-View) to measure the diameters of 200 or more hollow metal nanoparticles, and measuring an average particle diameter through a statistical distribution obtained.

According to an exemplary embodiment of the present specification, the hollow metal nanoparticle may have an average particle diameter of 1 nm to 30 nm.

According to an exemplary embodiment of the present specification, the hollow metal nanoparticle may have an average particle diameter of 1 nm to 20 nm.

According to an exemplary embodiment of the present specification, the hollow metal nanoparticle may have an average particle diameter of 1 nm to 12 nm.

According to an exemplary embodiment of the present specification, the hollow metal nanoparticle may have an average particle diameter of 1 nm to 10 nm.

According to an exemplary embodiment of the present specification, the hollow metal nanoparticle may have an average particle diameter of 1 nm to 6 nm.

The shell portion in the hollow metal nanoparticle in an exemplary embodiment of the present specification may have a thickness of more than 0 nm and 5 nm or less, more specifically more than 0 nm and 3 nm or less.

For example, when the hollow metal nanoparticle includes a hollow, the average particle diameter is 30 nm, the shell portion may have a thickness of more than 0 nm and 5 nm or less, and more specifically, the hollow metal nanoparticle has an average particle diameter of 20 nm or less or 10 nm or less, and the shell portion may have a thickness of more than 0 nm and 3 nm or less. According to an exemplary embodiment of the present specification, the hollow of the hollow metal nanoparticle may have a particle diameter of 1 nm to 10 nm, specifically 1 nm to 4 nm. Further, each shell may have a thickness of 0.2 nm to 5 nm, specifically 0.25 nm to 3 nm. The shell portion may also be a shell formed by mixing the first metal and the second metal, and may be a plurality of shells including a first shell and a second shell, which are separately formed by varying the mixture ratio of each of the first metal and the second metal. Alternatively, the shell portion may also be a plurality of shells including a first shell including only the first metal and a second shell including only the second metal.

According to an exemplary embodiment of the present specification, one or more hollow metal nanoparticles may be prepared when the hollow metal nanoparticle is prepared. In this case, according to an exemplary embodiment of the present specification, the particle diameter of the hollow metal nanoparticle may be in a range of 80% to 120% of the average particle diameter of the hollow metal nanoparticles. Specifically, the particle diameter of the hollow metal nanoparticle may be in a range of 90% to 110% of the average particle diameter of the hollow metal nanoparticles. When the average diameter exceeds the range, the size of the hollow metal nanoparticles becomes non-uniform as a whole, so that it may be difficult to secure unique physical property values required for the hollow metal nanoparticles. For example, when hollow metal nanoparticles exceeding a range of 80% to 120% of the average particle diameter of the hollow metal nanoparticles are used as a catalyst, the effects of improvement in efficiency may become a little insufficient. Therefore, when the average particle diameter is in a range of 80% to 120% of the average particle diameter of the hollow metal nanoparticles of the specification of the present application, nanoparticles having a uniform size may be formed to exhibit excellent physical properties as a nanoparticle.

When two or more hollow metal nanoparticles according to the present specification are prepared, the content of hollow metal nanoparticles according to the specification of the present application, which include a cavity extending from the outer surface of the shell portion to the hollow core in one or two more regions of the shell portion, may be 50% to 100% of the entire nanoparticles. Specifically, the content of the hollow metal nanoparticles including a cavity, which is continuous from the outer surface of the shell portion to the hollow core portion, may be 70% to 100% of the entire nanoparticles.

According to an exemplary embodiment of the present specification, the hollow metal nanoparticle may include one cavity.

According to an exemplary embodiment of the present specification, the shell portion may be formed of a single layer. In this case, the shell portion formed of the single layer may include both the first metal and the second metal.

According to an exemplary embodiment of the present specification, when the shell portion is formed of a single layer, the shell portion may be present in a form in which the first metal and the second metal are mixed. Furthermore, when the shell portion is formed of a single layer, the first metal and the second metal may be uniformly or non-uniformly mixed.

According to an exemplary embodiment of the present specification, the shell portion may be formed of two or more layers. Specifically, according to an exemplary embodiment of the present specification, when the shell portion is formed of two or more layers, the shell portion may include: a first shell including the first metal; and a second shell including the second metal.

According to an exemplary embodiment of the present specification, the first shell includes the first metal, and may not include the second metal. Further, the second shell includes the second metal, and may not include the first metal.

In addition, according to an exemplary embodiment of the present specification, the first shell may have a higher content of the first metal than that of the second metal. Furthermore, the second shell may have a higher content of the second metal than that of the first metal.

According to an exemplary embodiment of the present specification, the first shell may be formed in a form which surrounds the hollow, and the second shell may be formed in a form which surrounds the first shell.

According to an exemplary embodiment of the present specification, the shell portion may include: a first shell having a higher content of the first metal than that of the second metal; and a second shell having a higher content of the second metal than that of the first metal.

Specifically, according to an exemplary embodiment of the present specification, the content of the first metal in the first shell may be highest in a region which is close to the center of the hollow, and the content of the first metal may be gradually decreased as the first shell becomes far from the center of the hollow. Further, the content of the second metal in the first shell may be increased as the first shell becomes far from the center of the hollow.

Further, according to an exemplary embodiment of the present specification, the content of the second metal in the second shell may be highest in a region which is farthest from the center of the hollow, and the content of the second metal may be gradually decreased as the second shell becomes far from the center of the hollow. Further, the content of the first metal in the second shell may be decreased as the second shell becomes far from the center of the hollow. Specifically, the shell portion may be present in a state where the first metal and the second metal are gradated, the first metal may be present by 50% by volume or more or 70% by volume or more at a portion adjacent to the core in the shell portion, and the second metal may be present by 50% by volume or more or 70% by volume or more at a surface portion which is in contact with the outer portion of nanoparticle in the shell portion.

According to an exemplary embodiment of the present specification, the atomic percentage ratio of the first metal to the second metal in the shell portion may be 1:5 to 10:1. The atomic percentage ratio may be an atomic percentage ratio of the first metal of the first shell to the second metal of the second shell when the shell portion is formed of the first sell and the second sell. Alternatively, the atomic percentage ratio may be an atomic percentage ratio of the first metal to the second metal when the shell portion is formed of a single layer including the first metal and the second metal.

The shell portion of the present specification may mean an external material layer which surrounds the hollow. Specifically, the form of the hollow metal nanoparticle may be determined by the shell portion.

According to an exemplary embodiment of the present specification, the shell portion may have a thickness of more than 0 nm and 5 nm or less. Specifically, the shell portion may have a thickness of more than 0 nm and 3 nm or less. For example, when the hollow metal nanoparticle has an average particle diameter of 30 nm or less, the shell portion may have a thickness of more than 0 nm and 5 nm or less. Alternatively, when the hollow metal nanoparticle has an average particle diameter of 20 nm or less or 10 nm or less, the shell portion may have a thickness of more than 0 nm and 3 nm or less.

According to an exemplary embodiment of the present specification, the first metal may be selected from the group consisting of metals, metalloids, lanthanide metals, and actinide metals, which belong to Groups 3 to 15 of the periodic table. Specifically, the first metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

According to an exemplary embodiment of the present specification, the second metal may be different from the first metal.

According to an exemplary embodiment of the present specification, the second metal may be selected from the group consisting of metals, metalloids, lanthanide metals, and actinide metals, which belong to Groups 3 to 15 of the periodic table. Specifically, the second metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

As a specific example, according to an exemplary embodiment of the present specification, the first metal may be selected from the group consisting of platinum (Pt), silver (Ag), palladium (Pd), and gold (Au), and more specifically platinum (Pt). In this case, the second metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically nickel (Ni).

As another specific example, according to an exemplary embodiment of the present specification, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically nickel (Ni). In this case, the second metal may be selected from the group consisting of platinum (Pt), silver (Ag), palladium (Pd), and gold (Au), and more specifically platinum (Pt).

According to an exemplary embodiment of the present specification, the first metal and the second metal are different from each other, and the first metal or the second metal may be nickel.

According to an exemplary embodiment of the present specification, the first metal and the second metal are different from each other, and the first metal or the second metal may be platinum.

According to an exemplary embodiment of the present specification, the first metal is nickel, and the second metal may be platinum.

According to an exemplary embodiment of the present specification, the cavity may mean an empty space which is continuous from one region of the outer surface of the hollow metal nanoparticle. The cavity of the present specification may be formed in the form of one tunnel extending from the outer surface of the shell portion to the hollow core in one or two or more regions of the shell portion. The tunnel form may be a straight line, a continuous form of a curve or a straight line, and a continuous form in which a curve and a straight line are mixed.

According to an exemplary embodiment of the present specification, the cavity may be an empty space extending from the outer surface of the shell portion to the hollow.

Further, according to an exemplary embodiment of the present specification, the hollow metal nanoparticle may include an empty region, which is connected from one or more surfaces of the outer side thereof to the center of the hollow nanoparticle, by the cavity.

The cavity of the present specification may serve to utilize the inner surface area of the hollow metal nanoparticle. Specifically, when the hollow metal nanoparticle is used for a use such as a catalyst, the cavity may serve to increase a surface area which may be brought into contact with the reactant. Therefore, the cavity may serve to exhibit high activity of the hollow metal nanoparticle.

Specifically, the hollow metal nanoparticle of the present specification may include the cavity to increase the surface area by 20% to 100% as compared to a hollow metal nanoparticle having no cavity.

According to an exemplary embodiment of the present specification, the diameter of the cavity may be 5% to 30% of the particle diameter of the hollow metal nanoparticle.

When the diameter of the cavity is less than 5% of the particle diameter of the hollow metal nanoparticle, the activity of the hollow metal nanoparticle may not be sufficiently exhibited. Further, when the diameter of the cavity is more than 30% of the particle diameter of the hollow metal nanoparticle, the form of the hollow metal nanoparticle may not be maintained. Therefore, when the diameter of the cavity is 5% to 30% of the particle diameter of the hollow metal nanoparticle, it is possible to have an advantage in that the contact area with the reactant may be sufficiently enlarged through the cavity.

Hereinafter, a method for fabricating the hollow metal nanoparticle will be described.

An exemplary embodiment of the present specification provides a method for fabricating metal nanoparticles, the method including: forming a solution including: a solvent; a first metal salt which provides a first metal ion or an atomic group ion including the first metal ion in the solvent; a second metal salt which provides a second metal ion or an atomic group ion including the second metal ion in the solvent; a first surfactant which forms micelles in the solvent; and a second surfactant which forms micelles together with the first surfactant in the solvent; and forming the metal nanoparticle by adding a reducing agent to the solution.

According to an exemplary embodiment of the present specification, the preparation method may include that the inner region of the micelle formed by the first surfactant is formed of a hollow.

The method for fabricating metal nanoparticles according to an exemplary embodiment of the present specification does not use the reduction potential difference and thus has an advantage in that the reduction potential between the first metal ion and the second metal ion, which form shells, is not considered. The preparation method of the present specification uses charges among metal ions and thus is simpler than the methods for preparing a metal nanoparticle, which uses the reduction potential difference in the related art. Therefore, the method for fabricating metal nanoparticles according to the present specification facilitates the mass production, and may prepare the metal nanoparticle at low costs. Furthermore, the method does not use the reduction potential difference and thus has an advantage in that various metal salts may be used because the limitation of the metal salt to be used is reduced as compared to the methods for preparing a metal nanoparticle in the related art.

According to an exemplary embodiment of the present specification, a hollow core may be formed inside of the metal nanoparticle by the preparation method.

According to an exemplary embodiment of the present specification, the forming of the solution may include forming, by the first and second surfactants, micelles in a solution.

According to an exemplary embodiment of the present specification, in the preparation method, the first metal ion or the atomic group ion including the first metal ion; and the second metal ion or the atomic group ion including the second metal ion may form a shell portion of the metal nanoparticle.

According to an exemplary embodiment of the present specification, the first metal ion or the atomic group ion including the first metal ion has a charge which is opposite to a charge at the outer end portion of the first surfactant, and the second metal ion or the atomic group ion including the second metal ion may have a charge which is the same as the charge at the outer end portion of the first surfactant.

Therefore, the first metal ion or the atomic group ion including the first metal ion is positioned at the outer end portion of the first surfactant which forms micelles in the solution, thereby producing a form which surrounds the outer surface of the micelle. Furthermore, the second metal ion or the atomic group ion including the second metal ion surrounds the outer surface of the first metal ion or the atomic group ion including the first metal ion. The first metal salt and the second metal salt may form a shell portion including the first metal and the second metal, respectively, by a reducing agent.

The outer end portion of the surfactant in the present specification may mean the outer side portion of the micelle of the first or second surfactant which forms the micelle. The outer end portion of the surfactant of the present specification may mean the head of the surfactant. Further, the outer end portion of the present specification may determine the charge of the surfactant.

In addition, the surfactant of the present specification may be classified into an ionic surfactant or a non-ionic surfactant depending on the type of the outer end portion, and the ionic surfactant may be a cationic surfactant, an anionic surfactant, a zwitterionic surfactant or an amphoteric surfactant. The zwitterionic surfactant contains both positive and negative charges. If the positive and negative charges in the surfactant of the present specification are dependent on the pH, the surfactant may be an amphoteric surfactant, which may be zwitterionic in a certain pH range. Specifically, the anionic surfactant in the present specification may mean that the outer end portion of the surfactant is negatively charged, and the cationic surfactant may mean that the outer end portion of the surfactant is positively charged.

According to an exemplary embodiment of the present specification, in the metal nanoparticle prepared by the preparation method, a cavity may be formed in one or more regions of the shell portion.

The cavity of the present specification may mean an empty space which is continuous from one region of the outer surface of the metal nanoparticle. The cavity of the present specification may be formed in the form of one tunnel from one region of the outer surface of the shell portion. The tunnel form may be a straight line, a continuous form of a curve or a straight line, and a continuous form in which a curve and a straight line are mixed.

According to an exemplary embodiment of the present specification, when the metal nanoparticle includes a hollow, the cavity may be an empty space extending from the outer surface of the shell portion to the hollow.

According to an exemplary embodiment of the present specification, in the preparation method, a cavity may be formed in one or two or more regions of the shell portion by adjusting the concentration; the chain length; the size of the outer end portion; or the type of charge, of the second surfactant.

According to an exemplary embodiment of the present specification, the shell portion may mean a region of the nanoparticle including the metal. Specifically, the shell portion may mean a region of the metal particle except for the hollow and the cavity.

According to an exemplary embodiment of the present specification, the first surfactant may serve to form micelles in a solution to allow the metal ion or the atomic group ion including the metal ion to form a shell portion, and the second surfactant may serve to form the cavity of the metal nanoparticle.

According to an exemplary embodiment of the present specification, the preparation method may include forming the shell portion of the metal nanoparticle in a micelle region which the first surfactant forms, and forming the cavity of the metal nanoparticle in a micelle region which the second surfactant forms.

According to an exemplary embodiment of the present specification, the forming of the solution may include adjusting the size or number of the cavities by varying the concentrations of the first and second surfactants. Specifically, according to an exemplary embodiment of the present specification, the molar concentration of the second surfactant may be 0.01 to 1 time the molar concentration of the first surfactant. Specifically, the molar concentration of the second surfactant may be 1/30 to 1 time the molar concentration of the first surfactant.

According to an exemplary embodiment of the present specification, the first surfactant and the second surfactant in the forming of the solution may form micelles depending on the concentration ratio. The size of the cavities or the number of the cavities in the metal nanoparticle may be adjusted by adjusting the molar concentration ratio of the first surfactant to the second surfactant. Furthermore, a metal nanoparticle including one or more bowl type particles may also be prepared by allowing the cavity to be continuously formed.

Further, according to an exemplary embodiment of the present specification, the forming of the solution may include adjusting the size of the cavity by adjusting the size of the outer end portion of the second surfactant.

In addition, according to an exemplary embodiment of the present specification, the forming of the solution may include forming a cavity in the second surfactant region by adjusting the chain length of the second surfactant to be different from the chain length of the first surfactant.

According to an exemplary embodiment of the present specification, the chain length of the second surfactant may be 0.5 to 2 times the chain length of the first surfactant. Specifically, the chain length may be determined by the number of carbon atoms.

According to an exemplary embodiment of the present specification, it is possible to allow a metal salt bonded to the outer end portion of the second surfactant not to form the shell portion of the metal nanoparticle by making the chain length of the second surfactant different from the chain length of the first surfactant.

Furthermore, according to an exemplary embodiment of the present specification, the forming of the solution may include forming a cavity by adjusting the charge of the second surfactant to be different from the charge of the first surfactant.

According to an exemplary embodiment of the present specification, a first metal ion or an atomic group ion including the first metal ion, which has a charge opposite to the first and second surfactants, may be positioned at the outer end portions of the first and second surfactants, which form micelles in the solvent. Further, the second metal ion opposite to the charge of the first metal ion may be positioned on the outer surface of the first metal ion.

According to an exemplary embodiment of the present specification, the first metal ion and the second metal ion, which are formed at the outer end portion of the first surfactant, may form the shell portion of the metal nanoparticle, and the first metal ion and the second metal ion, which are positioned at the outer end portion of the second surfactant, do not form the shell and may form a cavity.

According to an exemplary embodiment of the present specification, when the first surfactant is an anionic surfactant, the first surfactant forms micelles in the forming of the solution, and the micelle may be surrounded by cations of the first metal ion or the atomic group ion including the first metal ion. Furthermore, the atomic group ion including the second metal ion of the anion may surround the cations. Furthermore, in the forming of the metal nanoparticle by adding a reducing agent, the cations surrounding the micelle forms a first shell, and the anions surrounding the cations may form a second shell.

In addition, according to an exemplary embodiment of the present specification, when the first surfactant is a cationic surfactant, the first surfactant forms micelles in the forming of the solution, and the micelle may be surrounded by anions of the atomic group ion including the first metal ion. Furthermore, the second metal ion of the cation or the atomic group ion including the second metal ion may surround the anions. Furthermore, in the forming of the metal nanoparticle by adding a reducing agent, the anions surrounding the micelle form a first shell, and the cations surrounding the anions may form a second shell.

According to an exemplary embodiment of the present specification, the forming of the metal nanoparticle may include forming the first and second surfactant regions, which form the micelles, with a hollow.

According to an exemplary embodiment of the present specification, both the first surfactant and the second surfactant may be a cationic surfactant.

Alternatively, according to an exemplary embodiment of the present specification, both the first surfactant and the second surfactant may be an anionic surfactant.

According to an exemplary embodiment of the present specification, when both the first surfactant and the second surfactant have the same charge, a micelle may be formed by making the chain length of the second surfactant different from the chain length of the first surfactant. Specifically, by a difference in chain lengths of the second surfactant, the first and second metal ions positioned at the outer end portion of the second surfactant are not adjacent to the first and second metal ions positioned at the outer end portion of the first surfactant, and thus, do not form the shell portion.

According to an exemplary embodiment of the present specification, one of the first surfactant and the second surfactant may be an anionic surfactant, and the other may be a cationic surfactant. That is, in an exemplary embodiment of the present specification, the first and second surfactants may have charges different from each other.

According to an exemplary embodiment of the present specification, when the first and second surfactants have charges different from each other, the cavity of the metal nanoparticle may be formed by making the lengths of the chains different. In this case, the principle in which the cavity is formed is the same as the case where the above-described first and second surfactants have the same charge.

According to an exemplary embodiment of the present specification, when the first and second surfactants have charges different from each other, the cavity of the metal nanoparticle may be formed even though the lengths of the chains of the first and second surfactants are the same as each other. In this case, the outer end portion of the first surfactant, which is adjacent to the outer end portion of the second surfactant in the micelle, donates and accepts charges, and thus, is neutralized, so that the metal ion is not positioned. Therefore, the portion in which the metal ion is not positioned does not form a shell portion, thereby forming the cavity of the metal nanoparticle.

According to an exemplary embodiment of the present specification, the first surfactant may be an anionic surfactant or a cationic surfactant, and the second surfactant may be a non-ionic surfactant.

According to an exemplary embodiment of the present specification, when the second surfactant is a non-ionic surfactant, the cavity of the metal nanoparticle may be formed because the metal ion is not positioned at the outer end portion of the second surfactant. Therefore, when the second surfactant is non-ionic, the cavity of the metal nanoparticle may be formed even when the length of the chain of the second surfactant is the same as or different from that of the first surfactant.

According to an exemplary embodiment of the present specification, the first surfactant may be an anionic surfactant or a cationic surfactant, and the second surfactant may be a zwitterionic surfactant.

According to an exemplary embodiment of the present specification, when the second surfactant is a zwitterionic surfactant, the cavity of the metal nanoparticle may be formed because the metal ion is not positioned at the outer end portion of the second surfactant. Therefore, when the second surfactant is zwitterionic, the cavity of the metal nanoparticle may be formed even when the length of the chain of the second surfactant is the same as or different from that of the first surfactant.

The anionic surfactant of the present specification may be selected from the group consisting of ammonium lauryl sulfate, sodium 1-heptanesulfonate, sodium hexanesulfonate, sodium dodecyl sulfate, triethanol ammonium dodecylbenzenesulfate, potassium laurate, triethanolamine stearate, lithium dodecyl sulfate, sodium lauryl sulfate, alkyl polyoxyethylene sulfate, sodium alginate, dioctyl sodium sulfosuccinate, phosphatidylglycerol, phosphatidylinositol, phosphatidylserine, phosphatidic acid and salts thereof, glyceryl esters, sodium carboxymethylcellulose, bile acids and salts thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and salts thereof, calcium stearate, phosphate, carboxymethylcellulose sodium, dioctyl sulfosuccinate, dialkyl esters of sodium sulfosuccinate, phospholipids, and calcium carboxymethylcellulose. However, the anionic surfactant is not limited thereto.

The cationic surfactant of the present specification may be selected from the group consisting of quaternary ammonium compounds, benzalkonium chloride, cetyltrimethylammonium bromide, chitosan, lauryldimethylbenzylammonium chloride, acyl carnitine hydrochloride, alkyl pyridinium halide, cetyl pyridinium chloride, cationic lipids, polymethylmethacrylate trimethylammonium bromide, sulfonium compounds, polyvinylpyrrolidone-2-dimethylaminoethyl methacrylate dimethyl sulfate, hexadecyltrimethyl ammonium bromide, phosphonium compounds, benzyl-di(2-chloroethyl)ethylammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, ($C_{12}$-$C_{15}$)dimethyl hydroxyethyl ammonium chloride, ($C_{12}$-$C_{15}$)dimethyl hydroxyethyl ammonium chloride bromide, coconut dimethyl hydroxyethyl ammonium chloride, coconut dimethyl hydroxyethyl ammonium bromide, myristyl trimethyl ammonium methyl sulfate, lauryl dimethyl benzyl ammonium chloride, lauryl dimethyl benzyl ammonium bromide, lauryl dimethyl (ethenoxy)$_4$ ammonium chloride, lauryl dimethyl (ethenoxy)$_4$ ammonium bromide, N-alkyl ($C_{12-18}$) dimethylbenzyl ammonium chloride, N-alkyl ($C_{14-18}$) dimethyl-benzyl ammonium chloride, N-tetradecylidimethylbenzyl ammonium chloride monohydrate, dimethyl didecyl ammonium chloride, N-alkyl ($C_{12-14}$)dimethyl 1-napthylmethyl ammonium chloride, trimethylammonium halide alkyl-trimethyl-ammonium salts, dialkyl-dimethylammonium salts, lauryl trimethyl ammonium chloride, ethoxylated alkyamidoalkyldialkylammonium salts, ethoxylated trialkyl ammonium salts, dialkylbenzene dialkylammonium chloride, N-didecyldimethyl ammonium chloride, N-tetradecyldimethylbenzyl ammonium chloride monohydrate, N-alkyl($C_{12-14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethyl ammonium bromide, $C_{15}$ trimethyl ammonium bromide, $C_{17}$ trimethyl ammonium bromides, dodecylbenzyl triethyl ammonium chloride, poly-diallyldimethylammonium chloride, dimethyl ammonium chloride, alkyldimethylammonium halogenide, tricetyl methyl ammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyl trimethylammonium bromide, choline esters, benzalkonium chloride, stearalkonium chloride, cetyl pyridinium bromide, cetyl pyridinium chloride, halide salts of quaternized polyoxyethylalkylamines, "MIRAPOL" (polyquaternium-2), "Alkaquat" (alkyl dimethyl benzylammonium chloride, manufactured by Rhodia), alkyl pyridinium salts, amines, amine salts, imide azolinium salts, protonated quaternary acrylamides, methylated quaternary polymers, cationic guar gum, benzalkonium chloride, dodecyl trimethyl ammonium bromide, triethanolamine, and poloxamines. However, the cationic surfactant is not limited thereto.

The non-ionic surfactant of the present specification may be selected from the group consisting of SPAN 60, polyoxyethylene fatty alcohol ethers, polyoxyethylene sorbitan fatty acid esters, polyoxyethylene fatty acid esters, polyoxyethylene alkyl ethers, polyoxyethylene castor oil derivatives, sorbitan esters, glyceryl esters, glycerol monostearate, polyethylene glycols, polypropylene glycols, polypropylene glycol esters, cetyl alcohol, cetostearyl alcohol, stearyl alcohol, aryl alkyl polyether alcohols, polyoxyethylene-polyoxypropylene copolymers, poloxamers, poloxamines, methylcellulose, hydroxycellulose, hydroxymethylcellulose, hydroxyethylcellulose, hydroxypropylcellulose, hydroxypropylmethylcellulose, hydroxypropylmethylcellulose phthalate, non-crystalline cellulose, polysaccharides, starch, starch derivatives, hydroxyethyl starch, polyvinyl alcohol, triethanolamine stearate, amine oxide, dextran, glycerol, gum acacia, cholesterol, tragacanth, and polyvinylpyrrolidone.

The zwitterionic surfactant of the present specification may be selected from the group consisting of N-dodecyl-N,N-dimethyl-3-ammonio-1-propanesulfonate, betaine, alkyl betaine, alkylamido betaine, amido propyl betaine, cocoampho carboxy glycinate, sarcosinate aminopropionate, aminoglycinate, imidazolinium betaine, amphoteric imidazoline, N-alkyl-N,N-dimethylammonio-1-propanesulfonates, 3-cholamido-1-propyldimethylammonio-1-propanesulfonate, dodecylphosphocholine, and sulfo-betaine. However, the zwitterionic surfactant is not limited thereto.

According to an exemplary embodiment of the present specification, the concentration of the first surfactant may be 1 time to 5 times the critical micelle concentration to the solvent. Specifically, the concentration of the first surfactant may be 2 times the critical micelle concentration to the solvent.

The critical micelle concentration (CMC) in the present specification means the lower limit of the concentration at which the surfactant forms a group (micelle) of molecules or ions in a solution.

The most important characteristics of the surfactant are that the surfactant tends to be adsorbed on an interface, for example, an air-liquid interface, an air-solid interface, and a liquid-solid interface. When the surfactants are free in the sense of not being present in an aggregated form, they are referred to as monomers or unimers, and when the unimer concentration is increased, they are aggregated to form small entities of aggregates, that is, micelles. The concentration may be referred to as the critical micelle concentration.

When the concentration of the first surfactant is less than 1 time the critical micelle concentration, the concentration of the first surfactant to be adsorbed on the first metal salt may be relatively decreased. Accordingly, the amount of core particles to be formed may also be entirely decreased. Meanwhile, when the concentration of the first surfactant exceeds 5 times the critical micelle concentration, the concentration of the first surfactant is relatively increased, so that metal nanoparticles which form a hollow core, and metal particles which do not form a hollow core may be mixed, and thus, aggregated. Accordingly, when the concentration of the first surfactant is 1 time to 5 times the critical micelle concentration to the solvent, the metal nanoparticles may be smoothly formed.

According to an exemplary embodiment of the present specification, the size of the metal nanoparticles may be adjusted by adjusting the first surfactant which forms the micelle, and/or the first and second metal salts which surround the micelle.

According to an exemplary embodiment of the present specification, the size of the metal nanoparticles may be adjusted by the chain length of the first surfactant which forms the micelle. Specifically, when the chain length of the first surfactant is short, the size of the micelle becomes small, and accordingly, the size of the metal nanoparticles may be decreased.

According to an exemplary embodiment of the present specification, the number of carbon atoms of the chain of the first surfactant may be 15 or less. Specifically, the number of carbon atoms of the chain may be 8 to 15. Alternatively, the number of carbon atoms of the chain may be 10 to 12.

According to an exemplary embodiment of the present specification, the size of the metal nanoparticles may be adjusted by adjusting the type of counter ion of the first surfactant which forms the micelle. Specifically, the larger the size of the counter ion of the first surfactant is, the weaker the binding force of the outer end portion of the first surfactant to the head portion is, so that the size of the micelle may be increased, and accordingly, the size of the metal nanoparticles may be increased.

According to an exemplary embodiment of the present specification, when the first surfactant is an anionic surfactant, the first surfactant may include $NH_4^+$, $K^+$, $Na^+$, or $Li^+$ as the counter ion.

Specifically, the size of the metal nanoparticles may be decreased in the order of the case where the counter ion of the first surfactant is $NH_4^+$, the case where the counter ion of the first surfactant is $K^+$, the case where the counter ion of the first surfactant is $Na^+$, and the case where the counter ion of the first surfactant is $Li^+$.

According to an exemplary embodiment of the present specification, when the first surfactant is a cationic surfactant, the first surfactant may include $I^-$, $Br^-$, or $Cl^-$ as the counter ion.

Specifically, the size of the metal nanoparticles may be decreased in the order of the case where the counter ion of the first surfactant is $I^-$, the case where the counter ion of the first surfactant is $Br^-$, and the case where the counter ion of the first surfactant is $Cl^-$.

According to an exemplary embodiment of the present specification, the size of the metal nanoparticles may be adjusted by adjusting the size of the head portion of the outer end portion of the first surfactant which forms the micelle. Furthermore, when the size of the head portion of the first surfactant formed on the outer surface of the micelle is increased, the repulsive force between head portions of the first surfactant is increased, so that the micelle may be increased, and accordingly, the size of the metal nanoparticles may be increased.

According to an exemplary embodiment of the present specification, the aforementioned factors compositely act, so that the size of the metal nanoparticles may be determined.

According to an exemplary embodiment of the present specification, the metal salt is not particularly limited as long as the metal salt may be ionized in a solution to provide metal ions. The metal salt may be ionized in the solution state to provide a cation including a metal ion or an anion of an atomic group ion including the metal ion. The first metal salt and the second metal salt may be different from each other. Specifically, the first metal salt may provide a cation including a metal ion, and the second metal salt may provide an anion of an atomic group ion including the metal ion. Specifically, the first metal salt may provide a cation of $Ni^{2+}$, and the second metal salt may provide an anion of $PtCl_4^{2-}$.

According to an exemplary embodiment of the present specification, the first metal salt and the second metal salt are not particularly limited as long as the first and second metal salts may be ionized in a solution to provide a metal ion or an atomic group ion including the metal ion.

According to an exemplary embodiment of the present specification, the first metal salt and the second metal salt may be each independently a salt of a metal selected from the group consisting of metals, metalloids, lanthanide metals, and actinide metals, which belong to Groups 3 to 15 of the periodic table.

Specifically, the first metal salt and the second metal salt are different from each other, and may be each independently a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

More specifically, according to an exemplary embodiment of the present specification, the first metal salt may be a salt of a metal selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically, a salt of nickel (Ni).

More specifically, according to an exemplary embodiment of the present specification, the second metal salt may be a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal salt may be a salt of a metal selected from a group consisting of platinum (Pt), palladium (Pd), and gold (Au), and more specifically, a salt of platinum (Pt).

According to an exemplary embodiment of the present specification, the first metal salt and the second metal salt may be each independently a nitrate, a halide such as chloride, bromide, and iodide, a hydroxide or a sulfate of the metal. However, the first metal salt and the second metal salt are not limited thereto.

According to an exemplary embodiment of the present specification, the molar ratio of the first metal salt to the second metal salt in the forming of the solution may be 1:5 to 10:1. Specifically, the molar ratio of the first metal salt to the second metal salt may be 2:1 to 5:1.

When the number of moles of the first metal salt is smaller than the number of moles of the second metal salt, it is difficult for a first metal ion to form a first shell including a hollow. Further, when the number of moles of the first metal salt is more than 10 times the number of moles of the second metal salt, it is difficult for a second metal ion to form a second shell surrounding a first shell. Therefore, the first and second metal ions may smoothly form a shell portion of the metal nanoparticles in the range.

According to an exemplary embodiment of the present specification, the shell portion may include: a first shell including the first metal ion; and a second shell including the second metal ion.

According to an exemplary embodiment of the present specification, the atomic percentage ratio of the first metal to the second metal in the shell portion may be 1:5 to 10:1. The atomic percentage ratio may be an atomic percentage ratio of the first metal of the first shell to the second metal of the second shell when the shell portion is formed of the first sell and the second sell. Alternatively, the atomic percentage ratio may be an atomic percentage ratio of the first metal to the second metal when the shell portion is formed of one shell including the first metal and the second metal.

According to an exemplary embodiment of the present specification, the forming of the solution may further include further adding a stabilizer.

The stabilizer may be, for example, a mixture of one or two or more selected from the group consisting of disodium phosphate, dipotassium phosphate, disodium citrate, and trisodium citrate.

According to an exemplary embodiment of the present specification, the forming of the metal nanoparticle may include further adding a non-ionic surfactant together with the reducing agent.

The non-ionic surfactant is adsorbed on the surface of the shell and thus serves to uniformly disperse the metal nanoparticles formed in the solution. Therefore, the non-ionic surfactant may prevent metal particles from being conglomerated or aggregated to be precipitated and allow metal nanoparticles to be formed in a uniform size. Specific examples of the non-ionic surfactant are the same as the above-described examples of the non-ionic surfactant.

According to an exemplary embodiment of the present specification, the solvent may be a solvent including water. Specifically, according to an exemplary embodiment of the present application, the solvent serves to dissolve the first metal salt and the second metal salt, and may be water or a mixture of water and a $C_1$ to $C_6$ alcohol, and more specifically, water. Since the preparation method according to the present specification does not use an organic solvent as the solvent, a post-treatment process of treating an organic solvent in the preparation process is not needed, and accordingly, there are effects of reducing costs and preventing environmental pollution.

According to an exemplary embodiment of the present specification, the preparation method may be carried out at normal temperature. The preparation method may be carried out at specifically 4° C. to 35° C., and more specifically 12° C. to 28° C.

The forming of the solution in an exemplary embodiment of the present specification may be carried out at normal temperature, specifically 4° C. to 35° C., and more specifically 12° C. to 28° C. When an organic solvent is used as the solvent, there is a problem in that the preparation needs to be performed at a high temperature exceeding 100° C. Since the preparation may be carried out at normal temperature, the present application is advantageous in terms of process due to a simple preparation method, and has a significant effect of reducing costs.

According to an exemplary embodiment of the present specification, the forming of the solution may be performed for 5 minutes to 120 minutes, more specifically for 10 minutes to 90 minutes, and even more specifically for 20 minutes to 60 minutes.

According to an exemplary embodiment of the present specification, the forming of the metal nanoparticle including the cavity by adding a reducing agent and/or a non-ionic surfactant to the solution may also be carried out at normal temperature, specifically 4° C. to 35° C., and more specifically 12° C. to 28° C. Since the preparation method of the present specification may be carried out at normal temperature, the method is advantageous in terms of process due to a simple preparation method, and has a significant effect of reducing costs.

The forming of the metal nanoparticle including the cavity may be performed by reacting the solution with the reducing agent and/or the non-ionic surfactant for a predetermined time, specifically for 5 minutes to 120 minutes, more specifically for 10 minutes to 90 minutes, and even more specifically for 20 minutes to 60 minutes.

According to an exemplary embodiment of the present specification, the reducing agent may have a standard reduction potential of −0.23 V or less.

The reducing agent is not particularly limited as long as the reducing agent is a strong reducing agent having a standard reduction potential of −0.23 V or less, specifically from −4 V to −0.23 V, and has a reducing power which may reduce the dissolved metal ions to be precipitated as metal particles. Specifically, the reducing agent may be at least one selected from the group consisting of $NaBH_4$, $NH_2NH_2$, $LiAlH_4$, and LiBEt3H.

When a weak reducing agent is used, a reaction speed is slow and a subsequent heating of the solution is required, so that it is difficult to achieve a continuous process, and thus, there may be a problem in terms of mass production, and particularly, when ethylene glycol, which is one of weak reducing agents, is used, there is a problem in that the productivity is low in a continuous process due to a decrease in flow rate caused by high viscosity. Therefore, when the reducing agent of the present specification is used, it is possible to overcome the problem.

According to an exemplary embodiment of the present specification, the preparation method may further include, after the forming of the metal nanoparticles including the cavity, removing a surfactant inside the hollow. The removing method is not particularly limited, and for example, a method of washing the metal nanoparticles with water may be used. The surfactant may be an anionic surfactant and/or a cationic surfactant.

According to an exemplary embodiment of the present specification, the preparation method may further include, after the forming of the metal nanoparticle or after the removing of the surfactant inside the cavity, removing a cationic metal by adding an acid to the metal nanoparticle. When the acid is added to the metal nanoparticle in this step, a 3 d band metal is eluted. The cationic metal may be specifically selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu).

According to an exemplary embodiment of the present specification, the acid is not particularly limited, and for example, it is possible to use an acid selected from the group consisting of sulfuric acid, nitric acid, hydrochloric acid, perchloric acid, hydroiodic acid, and hydrobromic acid.

According to an exemplary embodiment of the present specification, after the metal nanoparticles are formed, the solution including the metal nanoparticles may be centrifuged in order to precipitate the metal nanoparticles included in the solution. It is possible to collect only the metal nanoparticles separated after the centrifugation. If necessary, a process of sintering the metal nanoparticles may be additionally performed.

According to an exemplary embodiment of the present specification, it is possible to prepare metal nanoparticles having a uniform size of several nanometers. By methods in the related art, it was difficult to manufacture several nanometer-sized metal nanoparticles, and it was more difficult to prepare uniform-sized metal nanoparticles.

The metal nanoparticles of the present specification may be used while replacing existing nanoparticles in the field in which nanoparticles may be generally used. The metal nanoparticles of the present specification have much smaller sizes and wider specific surface areas than the nanoparticles in the related art, and thus may exhibit better activity than the nanoparticles in the related art. Specifically, the metal nanoparticles of the present specification may be used in various fields such as a catalyst, drug delivery, and a gas sensor. The metal nanoparticles may also be used as a catalyst, or as an active material formulation in cosmetics, pesticides, animal nutrients, or food supplements, and may also be used as a pigment in electronic products, optical elements, or polymers.

An exemplary embodiment of the present specification provides a catalyst including the hollow metal nanoparticles.

MODE FOR INVENTION

Hereinafter, the present specification will be described in detail with reference to the Examples for specifically describing the present specification. However, the Examples according to the present specification may be modified in various forms, and it is not interpreted that the scope of the present application is limited to the Examples described in detail below. The Examples of the present specification are provided for more completely explaining the present specification to the person with ordinary skill in the art.

A first metal salt in the following Examples is a salt including a first metal ion, which is a precursor of the first metal, or an atomic group ion including the first metal ion, and may serve to provide the first metal. Further, a second metal salt is a salt including a second metal ion, which is a precursor of the second metal, or an atomic group ion including the second metal ion, and may serve to provide the second metal.

Example 1

$Ni(NO_3)_2$ as a first metal salt, $K_2PtCl_4$ as a second metal salt, ammonium lauryl sulfate (ALS) as a first surfactant, N-dodecyl-N,N-dimethyl-3-ammonio-1-propane sulfonate (DDAPS) as a second surfactant, and trisodium citrate as a stabilizer were added to distilled water to form a solution, and the solution was stirred for 30 minutes. In this case, the molar ratio of $K_2PtCl_4$ to $Ni(NO_3)_2$ was 1:3, ALS was 2 times the critical micelle concentration (CMC) to water, and DDAPS was 1/30 mole of ALS.

Subsequently, $NaBH_4$ as a reducing agent and polyvinyl pyrrolidone (PVP) as a non-ionic surfactant were added to the solution and the mixture was left to react for 30 minutes.

Thereafter, the mixture was centrifuged at 10,000 rpm for 10 minutes to discard the supernatant in the upper layer, and then the remaining precipitate was re-dispersed in distilled water, and then the centrifugation process was repeated to prepare the hollow metal nanoparticle including the cavity according to the specification of the present application. The process of preparing the metal nanoparticles was carried out under the atmosphere of 14° C.

A transmission electron microscope (TEM) image of the hollow metal nanoparticles of the specification of the present application, which were prepared according to Example 1, is illustrated in FIGS. 2 and 3. FIG. 3 illustrates an image obtained by reversing the color of FIG. 2. That is, FIG. 2 illustrates a dark field of TEM, and FIG. 3 illustrates a bright field of TEM.

The dark field TEM image of the present specification shows a bright image because diffraction significantly occurred in a shell portion having a large mass when the electron bunches of TEM touched the hollow metal nanoparticles. Further, a region with hollow of the nanoparticles is shown as a slightly dark image because the electron bunches of TEM are less diffracted. Further, a region of the shell portion with cavities is shown as a black image because the electron bunches of TEM are permeated as they are.

Example 2

$Ni(NO_3)_2$ as a first metal salt, $K_2PtCl_4$ as a second metal salt, ammonium lauryl sulfate (ALS) as a first surfactant, sodium 1-heptanesulfonate (SHS) as a second surfactant, and trisodium citrate as a stabilizer were added to distilled water to form a solution, and the solution was stirred for 30 minutes. In this case, the molar ratio of $K_2PtCl_4$ to $Ni(NO_3)_2$ was 1:3, ALS was 2 times the critical micelle concentration (CMC) to water, and SHS was 1/30 mole of ALS.

Subsequently, $NaBH_4$ as a reducing agent and polyvinyl pyrrolidone (PVP) as a non-ionic surfactant were added to the solution and the mixture was left to react for 30 minutes.

Thereafter, the mixture was centrifuged at 10,000 rpm for 10 minutes to discard the supernatant in the upper layer, and then the remaining precipitate was re-dispersed in distilled water, and then the centrifugation process was repeated to prepare the hollow metal nanoparticle including the cavity according to the specification of the present application. The process of preparing the metal nanoparticles was carried out under the atmosphere of 14° C.

A transmission electron microscope (TEM) image of the hollow metal nanoparticles of the specification of the present application, which were prepared according to Example 2, is illustrated in FIGS. 4 and 5. FIG. 5 illustrates an image obtained by reversing the color of FIG. 4. That is, FIG. 4 illustrates a dark field of TEM, and FIG. 5 illustrates a bright field of TEM.

Example 3

$Ni(NO_3)_2$ as a first metal salt, $K_2PtCl_4$ as a second metal salt, ammonium lauryl sulfate (ALS) as a first surfactant, sodium hexanesulfonate as a second surfactant, and trisodium citrate as a stabilizer were added to distilled water to form a solution, and the solution was stirred for 30 minutes. In this case, the molar ratio of $K_2PtCl_4$ to $Ni(NO_3)_2$ was 1:3, ALS was 2 times the critical micelle concentration (CMC) to water, and sodium hexanesulfonate was 1/30 mole of ALS.

Subsequently, $NaBH_4$ as a reducing agent and polyvinyl pyrrolidone (PVP) as a non-ionic surfactant were added to the solution and the mixture was left to react for 30 minutes.

Thereafter, the mixture was centrifuged at 10,000 rpm for 10 minutes to discard the supernatant in the upper layer, and then the remaining precipitate was re-dispersed in distilled water, and then the centrifugation process was repeated to prepare the hollow metal nanoparticle including the cavity according to the specification of the present application. The process of preparing the metal nanoparticles was carried out under the atmosphere of 14° C.

A transmission electron microscope (TEM) image of the hollow metal nanoparticles of the specification of the present application, which were prepared according to Example 3, is illustrated in FIGS. 6 and 7. FIG. 7 illustrates an image obtained by reversing the color of FIG. 6. That is, FIG. 6 illustrates a dark field of TEM, and FIG. 7 illustrates a bright field of TEM.

Example 4

Ni(NO3)2 as a first metal salt, K2PtCl4 as a second metal salt, sodium dodecyl sulfate (SDS) as a first surfactant, N-dodecyl-N,N-dimethyl-3-ammonio-1-propane sulfonate (DDAPS) as a second surfactant, and trisodium citrate as a stabilizer were added to distilled water to form a solution, and the solution was stirred for 30 minutes. In this case, the molar ratio of K2PtCl4 to Ni(NO3)2 was 1:3, SDS was 2 times the critical micelle concentration (CMC) to water, and DDAPS was 1/30 mole of SDS.

Subsequently, $NaBH_4$ as a reducing agent and polyvinyl pyrrolidone (PVP) as a non-ionic surfactant were added to the solution and the mixture was left to react for 30 minutes.

Thereafter, the mixture was centrifuged at 10,000 rpm for 10 minutes to discard the supernatant in the upper layer, and then the remaining precipitate was re-dispersed in distilled water, and then the centrifugation process was repeated to prepare the hollow metal nanoparticle including the cavity according to the specification of the present application. The process of preparing the metal nanoparticles was carried out under the atmosphere of 14° C.

A transmission electron microscope (TEM) image of the hollow metal nanoparticles of the specification of the present application, which were prepared according to Example 4, is illustrated in FIGS. 8 and 9. FIG. 9 illustrates an image obtained by reversing the color of FIG. 8. That is, FIG. 8 illustrates a dark field of TEM, and FIG. 9 illustrates a bright field of TEM.

The invention claimed is:

1. A hollow metal nanoparticle comprising:
   a hollow core portion;
   a shell portion comprising a first metal and a second metal; and
   a cavity extending from an outer surface of the shell portion to the hollow core portion in one or two or more regions of the shell portion,
   wherein the hollow metal nanoparticle has a particle diameter of 1 nm to 30 nm,
   wherein the hollow metal nanoparticle has a spherical shape and a diameter of the cavity is 5% to 30% of the particle diameter of the hollow metal nanoparticle, and
   wherein the particle diameter of the hollow metal nanoparticle is in a range of 80% to 120% of the average particle diameter of a plurality of hollow metal nanoparticles.

2. The hollow metal nanoparticle of claim 1, wherein the hollow metal nanoparticle has a particle diameter of 1 nm to 20 nm.

3. The hollow metal nanoparticle of claim 1, wherein the hollow metal nanoparticle has a particle diameter of 1 nm to 12 nm.

4. The hollow metal nanoparticle of claim 1, wherein the hollow metal nanoparticle has a particle diameter of 1 nm to 6 nm.

5. The hollow metal nanoparticle of claim 1, wherein the shell portion has a thickness of more than 0 nm and 5 nm or less.

6. The hollow metal nanoparticle of claim 1, wherein the hollow core portion is 50% by volume or more of the hollow metal nanoparticle.

7. The hollow metal nanoparticle of claim 1, wherein the hollow core portion comprises a surfactant.

8. The hollow metal nanoparticle of claim 1, wherein an atomic percentage ratio of the first metal to the second metal in the shell portion is 1:5 to 10:1.

9. The hollow metal nanoparticle of claim 1, wherein the shell portion comprises:
   a first shell comprising the first metal; and
   a second shell comprising the second metal.

10. The hollow metal nanoparticle of claim 1, wherein the shell portion comprises:
    a first shell having a higher content of the first metal than that of the second metal; and
    a second shell having a higher content of the second metal than that of the first metal.

11. The hollow metal nanoparticle of claim 1, wherein the first metal and the second metal are each independently selected from the group consisting of metals, metalloids, lanthanide metals, and actinide metals, which belong to Groups 3 to 15 of the periodic table.

12. The hollow metal nanoparticle of claim 1, wherein the first metal and the second metal are each independently selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

13. The hollow metal nanoparticle of claim 1, wherein the first metal and the second metal are different from each other, and the first metal or the second metal is nickel.

14. The hollow metal nanoparticle of claim 1, wherein the first metal and the second metal are different from each other, and the first metal or the second metal is platinum.

15. The hollow metal nanoparticle of claim 1, wherein the first metal is nickel, and the second metal is platinum.

* * * * *